United States Patent Office 3,325,492
Patented June 13, 1967

3,325,492
THIOPHOSPHORIC (-PHOSPHONIC, -PHOSPHINIC) OR DITHIOPHOSPHORIC (-PHOSPHONIC, -PHOSPHINIC) ACID ESTERS
Gerhard Schrader, Wuppertal-Cronenberg, and Ingeborg Hammann, Cologne, Germany, assignors to Farbenfabriken Bayer Aktiengesellschaft, Leverkusen, Germany, a corporation of Germany
No Drawing. Filed Mar. 24, 1965, Ser. No. 442,511
Claims priority, application Germany, Mar. 26, 1964, F 42,443
11 Claims. (Cl. 260—248)

The present invention relates to thiophosphoric (-phosphonic, and -phosphinic) and dithiophosphoric (-phosphonic, and -phosphinic) acid esters of the general structure

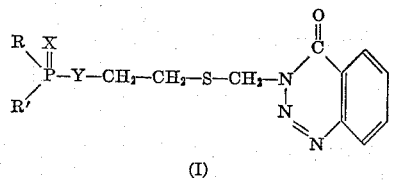

(I)

having outstanding insecticidal properties as well as insecticidal formulations or compositions containing such acid esters, and methods for producing and for using the same.

In the above formula, R and R' represent identical or different, preferably lower, alkyl or alkoxy groups or aryl radicals, preferably phenyl radicals, while X and Y mean oxygen or sulfur atoms, whereby at least one of the symbols X and Y must be a sulfur atom.

It is an object of the present invention to provide thio- and dithio- -phosphoric, -phosphonic, and -phosphinic acid esters of the foregoing type, and a process for their production.

It is a further object of the present invention to provide such thio- and dithio-phosphorous acid esters which are useful for pest control purposes, these compounds possessing outstanding pesticidal, and especially insecticidal, properties.

It is a still further object of the present invention to provide pesticidal compounds of the foregoing type as well as compositions containing these thio- and dithio-phosphorous acid esters, which may be used effectively to control pests on plant crops, in veterinary medicine, and in connection with general hygiene pursuits.

It is a still further object of the present invention to provide thio- and dithio-phosphorous acid esters of the foregoing type which are outstandingly effective against insect pests of the greatest variety, and particularly against caterpillars, flies, aphids and ticks.

It is a still further object of the present invention to provide thio- and dithio- phosphorous acid esters of the foregoing type which possess a good compatibility with plants.

It is still another object of the present invention to provide a process for producing such thio- and dithio-phosphorous acid esters starting from N-(2-haloethylmercapto-methyl)-benzazimide and O,O-dialkyl-thiolphosphoric acid, O,O-dialkyl-thiono-phosphoric acid, O,O-dialkyl-thionothiol-phosphoric acid, alkyl-O-alkyl-thiol-phosphonic acid, alkyl-O-alkyl-thiono-phosphonic acid, alkyl-O-alkyl-thionothiol-phosphonic acid, aryl-O-alkyl-thiol-phosphonic acid, aryl-O-alkyl-thiono - phosphonic acid, aryl-O-alkyl-thionothiol-phosphonic acid, dialkyl-thiol-phosphinic acid, dialkyl-thiono-phosphinic acid, dialkyl-thionothiol-phosphinic acid, diaryl-thiol-phosphinic acid, diaryl-thiono-phosphinic acid, diaryl-thionothiol-phosphinic acid, alkyl-aryl-thiol-phosphinic acid, alkyl-aryl-thiono-phosphinic acid, and alkyl-aryl-thionothiol-phosphinic acid, as the case may be, with such acid being used in the presence of an acid binding agent or in the form of its corresponding salt, such as its alkali salt.

It is still another object of the present invention to provide a process for producing such thio- and dithiophosphorous acid esters starting from N-(2-hydroxyethylmercapto-methyl)-benzazimide and O,O-dialkyl-thiono-phosphoric acid halide, alkyl-O-alkyl-thiono-phosphonic acid halide, aryl-O-alkyl-thiono-phosphonic acid halide, dialkyl-thiono-phosphinic acid halide, diaryl-thiono-phosphinic acid halide, and alkyl-aryl-thiono-phosphinic acid halide, as the case may be, in the presence of an acid binding agent.

It is still another object of the present invention to provide a method for controlling pests, and especially insects, which contemplates applying thereto and to their habitats thio- and dithio- phosphorous acid esters derived in accordance with the foregoing.

It is a particular object of the present invention to provide thio- and dithio-phosphorous acid esters of the type contemplated by Formula I hereinabove in which the symbol R thereof is $C_1$–$C_4$ lower alkoxy, the symbol R' thereof is $C_1$–$C_4$ lower alkoxy, or $C_1$–$C_4$ lower alkyl, or phenyl, and in which the symbols X and Y thereof are oxygen and/or sulfur, especially sulfur.

Other and further objects of the present invention will become apparent from a study of the within specification and accompanying examples.

It has been found in accordance with the present invention that compounds of the above constitution are obtained in a smoothly proceeding reaction and also with very good yields, when thio- or dithiophosphoric (-phosphonic, and -phosphinic) acids of the formula

(II)

in which R and R' have the foregoing meaning, preferably in the form of their salts, such as their corresponding alkali salts, including the alkali metal salts, e.g. sodium, potassium, and lithium salts, and the ammonium salt, or in the presence of acid-binding agents, are reacted with N-(2-haloethylmercapto-methyl)-benzazimide, especially the corresponding N-(2-chloroethylmercapto-methyl)- and N-(2-bromoethylmercapto-methyl)-benzazimides, or when thiono-phosphoric (-phosphonic, and -phosphinic) acid halides of the general constitution

(III)

are allowed to react with N-(2-hydroxyethylmercaptomethyl)-benzazimide, preferably in the presence of acid-acceptors, i.e. acid binding agents.

In the last-mentioned formulae, the symbols R, R', X and Y have the foregoing meaning, while Hal stands for a halogen atom, especially for a chlorine or bromine atom.

As acid-binding agents, alkali metal alcoholates or carbonates, such as sodium, potassium, and lithium-carbonates or -alcoholates, including especially alkylolates, and particularly $C_1$–$C_6$ lower alkanolates; furthermore tertiary amines, such as aryl amines, e.g. mononuclear aryl amines, including pyridine, trialiphatic amines, e.g. tri-loweralkyl amines, including triethylamine, and mixed alkyl-aryl amines, e.g. diloweralkyl-aryl amines, including diethyl-aniline, have proved to be particularly suitable.

The process according to the present invention is preferably carried out in the presence of inert organic solvents. For this purpose, especially lower aliphatic ketones, and preferably dialkyl ketones, for example $C_3$–$C_{12}$ diloweralkyl ketones, such as acetone, methyl ethyl ketone, diethyl ketone, methyl isopropyl ketone and methyl isobutyl ketone, and the like, and also lower aliphatic nitriles, preferably alkane nitriles, for example $C_1$–$C_4$ loweralkyl cyanides, e.g. acetonitrile, propionitrile, butyronitrile, and the like, may be considered.

Furthermore, it has proved to be advantageous to allow the reaction to proceed at slightly to moderately elevated temperatures (for example substantially between about 40 to 120° C., preferably 50 to 80° C.) and to continue stirring the reaction mixture for a prolonged time (for example substantially from about 1 to 6 hours), after the components have been combined, while heating such mixture at the stated temperatures.

The starting materials required for the reaction according to the present invention are readily obtainable, also on a technical scale, by methods known in principle. Thus the N - (2-hydroxyethylmercapto-methyl)-benzazimide is obtained by the reaction of N-chloromethyl-benzazimide with 2-hydroxyethylmercaptan in the presence of acid-binding agents (e.g. sodium alcoholates), whereas the N - (2-haloethylmercapto-methyl)-benzazimides are obtainable by the action of halogenating agents on the hydroxy compound prepared in the manner indicated. The production of the starting materials likewise takes place by preference in the presence of inert organic solvents. For this purpose, low-boiling aliphatic nitriles such as lower aliphatic nitriles and especially alkane nitriles such as $C_1$–$C_4$ lower alkyl cyanides, for example, acetonitrile, propionitrile, butyronitrile, and the like; and in particular, chlorinated hydrocarbons, and especially chlorinated lower aliphatic hydrocarbons, for example chloroform, carbon tetrachloride, methylene chloride and ethylene chloride, have proved suitable. The reactions are carried out at temperatures substantially between about 10 to 30° C.

The thio- and dithiophosphoric (-phosphonic, and -phosphinic) acid esters preparable according to the present invention are mostly colorless to slightly yellow-colored, water-insoluble oils which cannot be distilled without decomposition, even under substantially reduced pressure.

The product of the process of the present invention are distinguished by an outstanding effectiveness against insect pests of the greatest variety, particularly against caterpillars, flies and their larvae, aphids, worms, mites and ticks. Such compounds are therefore employed as pest control agents in plant protection and chiefly in veterinary medicine and hygiene.

Specifically, the instant compounds may be used per se or in the form of compositions with an inert dispersible carrier vehicle, such as in an amount of substantially between about 0.1–95% by weight of the mixture with the carrier vehicle, whereby the compositions are readily adaptable for use in connection with plant protection, for veterinary medicine and general hygienic applications. Moreover, the instant compounds may be used in admixture with other known beneficial substances compatible with plants, or pesticidally useful, whereby a broad spectrum of use for a particular formulation of mixtures of ingredients may be attained. Where the instant compounds are utilized with carrier vehicles, these contemplate the usual dispersible solid or dispersible liquid extenders or diluents customarily employed for pesticides. Examples of such compositions or formulations with carrier vehicles are those with emulsifiable concentrates, spray powders, pastes, soluble powders, dusting agents and granulates. The production of such formulations is carried out in a known manner (compare for example Agricultural Chemicals, March 1960, pp. 35–38). Suitable dispersible liquid carrier vehicles or auxiliaries are mainly: solvents, such as, optionally halogenated, e.g. chlorinated, aromatic hydrocarbons (e.g. xylene, benzene, chlorobenzenes), paraffins (for example petroleum fractions), ether, alcohols (for example methanol, ethanol, butanol), and amines (such as ethanolamine) or dimethyl formamide; whereas suitable finely divided solid carrier vehicles are, for example: natural or synthetic rock meals or powders (such as kaolin, chalk, i.e., calcium carbonate, alumina, talcum, highly dispersed silicic acid and silicates, e.g. alkali silicates). Also, liquid emulsifiers, such as non-ionic and anionic emulsifiers (for example, polyoxyethylene-fatty acid esters, and polyoxyethylene-fatty alcohol ethers, alkyl- and aryl-sulfonates), especially magnesium stearate, sodium oleate, etc., may be used, as well as dispersing agents, for example lignin, sulfite waste liquors and methyl cellulose.

As the artisan will appreciate, the instant active compounds will be present in a pesticidally, e.g. insecticidally, effective amount, such as in concentration of from 0.00025 to 0.01%.

The following examples are given for the purpose of illustrating, while not limiting, the present invention.

EXAMPLE 1

(a) 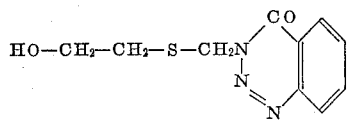

196 grams (1 mol) of N-chloromethyl-benzazimide are dissolved in 800 cc. of acetonitrile, and 78 g. of 2-hydroxyethylmercaptan, dissolved in 1 mol of sodium methylate solution, are added to this solution at 20 to 30° C. with stirring. The mixture is then kept at 30° C. for a further 3 hours, and the reaction mixture then poured into water. The separated oil is taken up in chloroform, the chloroform solution then separated, dried over sodium sulfate, and the solvent is finally removed under reduced pressure. 211 grams (89% of the theoretical) of N-(2-hydroxyethylmercapto-methyl)-benzazimide are obtained as residue. Upon standing for some time, the compound solidifies in the form of crystals and, after recrystallization, has a melting point of 76° C.

(b) 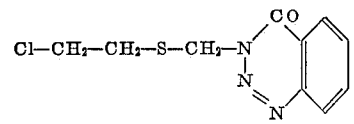

94 grams (0.4 mol) of N-(2-hydroxyethylmercapto-methyl)-benzazimide are dissolved in 300 cc. of ethylene chloride. 50 grams of thionyl chloride are added to this solution at 10 to 20° C. with stirring. The reaction mixture is then stirred for a further hour at the stated temperature, poured into 300 cc. of ice water, and the mixture thoroughly shaken. Finally, the ethylene chloride solution is separated and dried over sodium sulfate. After distilling off the solvent, there remain as residue 59 g. (58% of the theoretical) of N-(2-chloroethylmercapto-methyl)-benzazimide.

(c) 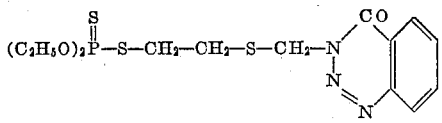

To a solution of 68 g. (0.33 mol) of potassium O,O-diethyl-thionothiol-phosphate in 200 cc. of methyl isopropyl ketone, there are added, while stirring, 77 g. of N-(2-chloroethylmercapto-methyl)-benzazimide, and the mixture is then heated at 90 to 100° C. for a further 3 hours. After this time, the reaction mixture is cooled to room temperature and poured into 300 cc. of ice water. The separated oil is taken up in 200 cc. of benzene, and the benzene solution washed with water and dried over sodium sulfate. After distilling off the solvent under reduced pressure, 79 g. (65% of the theoretical) of the O,O-diethyl-S-(3,4-dihydro-4-oxo - 1,2,3 - benzotriazin-3-yl-methylmercapto-ethyl)-thiono - thiol - phosphoric acid ester are obtained in the form of a yellow, water-insoluble oil.

*Analysis.*—Calculated for molecular weight of 405: P, 7.7%; S, 23.6%; N, 10.3%. Found: P, 7.7%; S, 22.5%; N, 9.4%.

EXAMPLE 2

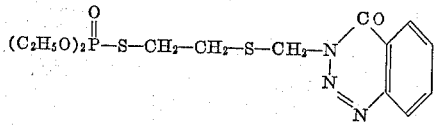

57 grams (0.33 mol) of ammonium O,O-diethyl-thiolphosphate are dissolved in 200 cc. of acetonitrile, and 90 g. of N-(2-chloroethylmercapto-methyl)-benzazimide, dissolved in 50 cc. of acetonitrile, are added to this solution at 80° C. with stirring. The mixture is subsequently stirred for a further 2 hours at 80° C. and then worked up as described in Example 1(c). 74 g. (64% of the theoretical) of the O,O-diethyl-S-(3,4-dihydro-4-oxo-1,2,3-benzotriazin-3-yl-methyl-mercapto - ethyl) - thiol - phosphoric acid ester are obtained as a yellow, water-insoluble oil.

*Analysis.*—Calculated for molecular weight of 389: P, 8.0%; S, 16.4%; N, 10.8%. Found: P, 8.0%; S, 16.8%; N, 9.8%.

EXAMPLE 3

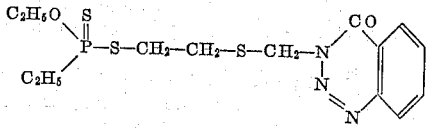

63 grams (0.3 mol) of the potassium salt of ethyl-O-ethyl-thionothiol-phosphonic acid salt are dissolved in 200 cc. of acetonitrile. To this solution, there are added at 80° C., while stirring, 90 g. of N-(2-chloroethylmercapto-methyl)-benzazimide, dissolved in 50 cc. of acetonitrile. The mixture is subsequently heated at 80° C. for a further hour and then worked up in the manner described in Example 1(c). 79 grams (68% of the theoretical) of the ethyl-O-ethyl-S-(3,4-dihydro-4-oxo-1,2,3-benzotriazin-3-yl-methylmercapto-ethyl) - thiono - thiol-phosphonic acid ester are obtained in the form of a light yellow, water-insoluble oil.

*Analysis.*—Calculated for molecular weight of 389: P, 8.0%; S, 24.6%; N, 10.8%. Found: P, 8.6%; S, 24.1%; N, 10.2%.

EXAMPLE 4

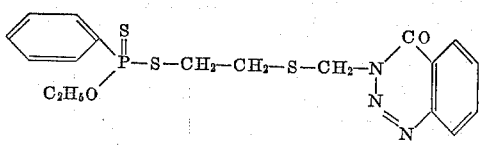

A solution of 77 g. (0.33 mol) of the potassium salt of phenyl-O-ethyl-thionothiol-phosphonic acid in 200 cc. of acetonitrile is treated at 80° C., while stirring, with 90 g. of N-(2-chloroethylmercapto-methyl)-benzazimide, dissolved in 50 cc. of acetonitrile. The reaction mixture is thereafter heated at 80° C. for a further hour and then worked up as described in Example 1(c). 98 grams (75% of the theoretical) of the phenyl-O-ethyl-S-(3,4-dihydro-4-oxo-1,2,3-benzotriazin - 3 - yl - methylmercapto-ethyl) - thionothiol - phosphonic acid ester are obtained as a yellow, water-insoluble oil.

*Analysis.*—Calculated for molecular weight of 437: P, 7.1%; S, 22.0%; N, 9.6%. Found: P, 7.2%; S, 21.0%; N, 9.0%.

EXAMPLE 5

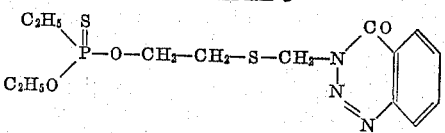

71 grams (0.33 mol) of N-(2-hydroxyethylmercaptomethyl)-benazimide are dissolved in 150 cc. of pyridine. To this solution, 52 g. of ethyl-O-ethyl-thiono-phosphonic acid chloride are added at 50° C. with stirring, and the mixture is subsequently heated at 40–50° C. for 5 hours. The reaction mixture is then poured into 300 cc. of ice water. The separated oil is taken up in 200 cc. of benzene, the benzene solution separated, washed with a 3% solution of sodium bicarbonate, and the organic layer finally dried over sodium sulfate. After distilling off the solvent, 94 g. of the ethyl - O - ethyl-O-(3,4-dihydro-4-oxo-1,2,3-benzotriazin - 3 - yl-methylmercapto-ethyl)-thiono-phosphonic acid ester are obtained in the form of a yellow, water-insoluble oil.

*Analysis.*—Calculated for molecular weight of 373: P, 8.3%; S, 17.2%; N, 11.3%. Found: P, 8.3%; S, 16.8%; N, 11.3%.

EXAMPLE 6

Using the procedure of Example 1 on the appropriate starting materials, including, on the one hand, N-(2-chloroethylmercapto - methyl) - benzazimide and, on the other hand, potassium, sodium, and ammonium O,O-dimethyl-, O,O-di-n-propyl-, O,O-di-isobutyl-, etc. -thiol- and -thionothiol- phosphates, respectively; methyl-O-methyl-, n-propyl-O-n-propyl-, isobutyl-O-isobutyl-, etc. -thiol- and -thionothiol- phosphonic acid potassium-, sodium-, and ammonium-salts, respectively; phenyl - O - methyl-, phenyl - O - n-propyl-, phenyl-O-isobutyl-, etc. -thiol- and -thionothiol- phosphonic acid potassium-, sodium-, and ammonium- salts, respectively; the corresponding O,O-dimethyl-, O,O-di-n-propyl, O,O-di-isobutyl-, etc. -S-(3,4-dihydro - 4 - oxo-1,2,3-benzotriazin-3-yl-methylmercaptoethyl)-thiol- and -thiono-thiol-phosphoric acid esters, respectively; methyl-O-methyl-, n-propyl-O-n-propyl-, isobutyl-O-isobutyl-, etc. -S-(3,4-dihydro-4-oxo-1,2,3-benzotriazin-3-yl-methylmercaptoethyl)-, thiol- and -thionothiol-phosphonic acid esters, respectively; and phenyl - O - methyl-, phenyl-O-n-propyl-, phenol-O-isobutyl-, etc. - S - (3,4-dihydro-4-oxo-1,2,3-benzotriazin-3-yl-methyl-mercapto-ethyl)-, thiol- and -thionothiol-phosphonic acid esters, respectively, are formed; all said phosphoric and phosphonic acid esters produced having similar active insecticidal properties to those of the foregoing compounds.

EXAMPLE 7

Using the procedure of Example 5 on the appropriate starting materials, including, on the one hand, N-(2-hydroxy - ethylmercapto - methyl)-benzazimide and, on the other hand, O,O-dimethyl-, O,O-di-n-propyl-, O,O-di-isobutyl, etc. -thionophosphoric acid chlorides respectively; methyl-O-methyl-, n-propyl-O-n-propyl-, isobutyl-O-isobutyl-, etc. -thiono-phosphonic acid chlorides, respectively; and phenyl-O-methyl-, phenyl-O-n-propyl-, phenyl-O-isobutyl-, etc. -thiono-phosphonic acid chlorides, respectively; the corresponding O,O-dimethyl-, O,O-di-n-propyl-, O,O-di-isobutyl-, etc. -O-(3,4-dihydro-4-oxo - 1,2,3 - benzotriazin-3-yl-methylmercaptoethyl)-thiono- phosphoric acid esters; methyl-O-methyl-, n-propyl-O-n-propyl-, isobutyl-O-isobutyl-, -O-(3,4-dihydro-4-oxo-1,2,3 - benzotriazine - 3-yl-methyl-mercaptoethyl)-thionophosphonic acid esters; and phenyl-O-methyl-, phenyl-O-n-propyl-, phenyl-O-isobutyl-, etc. -O-(3,4-dihydro-4-oxo-1,2,3 - benzotriazin - 3 - yl-methylmercaptoethyl)-thionophosphonic acid esters, respectively, are formed; all said phosphoric and phosphonic acid esters produced having similar active insecticidal properties to those of the foregoing compounds.

It will be appreciated by the artisan that the corresponding alkali salts of the starting phosphorous acids in question include within the term "alkali salts" both alkali metal and ammonium salts, such as potassium, sodium and lithium salts and the ammonium salt.

In the same way, as the artisan will appreciate, the terms "halo" and "halide" as used herein contemplate especially the chloro or chloride as well as the bromo or bromide groups, and also the iodo or iodide and fluoro or fluoride groups as well.

Preferably, in accordance with the present invention, in the foregoing formulae R and R' respectively represent a lower alkyl, lower alkoxy or phenyl group. Most especially, R represents a $C_1$-$C_4$ lower alkoxy group such as methoxy, ethoxy, n-propoxy, isopropoxy, n-butoxy, isobutoxy, sec.-butoxy and tert.-butoxy; while R' represents a $C_1$-$C_4$ lower alkoxy group such as noted under R immediately hereinbefore or a $C_1$-$C_4$ lower alkyl group such as methyl, ethyl, n-propyl, isopropyl, n-butyl, isobutyl, sec.-butyl and tert.-butyl, or the phenyl radical; with X and Y representing oxygen or sulfur, but most especially sulfur.

Thus, of preferred significance, for the purposes of the present invention in regard to insecticidal properties are the following kinds of compounds: O,O-dialkyl-S-(3,4-dihydro-4-oxo-1,2,3-benzotriazin-3-yl-methylmercapto-ethyl)-thionothiol-phosphoric acid ester; O,O-dialkyl-S-(3,4-dihydro-4-oxo-1,2,3-benzotriazin-3-yl-methylmercapto-ethyl)-thiol-phosphoric acid esters; alkyl-O-alkyl-S-(3,4-dihydro-4-oxo-1,2,3-benzotriazin-3-yl-methylmercapto-ethyl)-thionothiol-phosphoric acid esters; phenyl-O-alkyl-S-(3,4-dihydro-4-oxo-1,2,3-benzotriazin-3-yl-methylmercapto-ethyl)-thionothiol-phosphonic acid esters; and alkyl-O-alkyl-O-(3,4-dihydro-4-oxo-1,2,3-benzotriazin-3-yl-methylmercapto-ethyl)-thiono-phosphonic acid esters.

The various compounds produced in accordance with the present invention, because of their outstanding insecticidal activity, may be used per se or with a carrier vehicle and/or with other treating agents of varous types which are compatible therewith in various formulations, preparations, compositions, etc., in appropriately insecticidally effective amounts, as for example by applying such compounds per se or such formulations, etc. to the particular insects in question and their habitat, whereby to combat such insects and achieve pest control in connection with plant protection, veterinary medicine and general hygiene, depending upon the type of application of the active ingredients concerned.

As examples for the special utility some of the inventive compounds have been tested against various insect pests.

Example A
PLUTELLA TEST

Solvent: 3 parts by weight of acetone
Emulsifier: 1 part by weight of alkylarlypolyglycolether To produce a suitable preparation of active compound, 1 part by weight of the active compound is mixed with the stated amount of solvent containing the stated amount of emulsifier and the concentrate is diluted with water to the desired concentration.

Cabbage leaves (*Brassica oleracea*) are sprayed with the preparation of the active compound until dew moist and are then infested with caterpillars of the diamond-back moth (*Plutella maculipennis*).

After specified periods of time, the degree of destruction is determined as a percentage: 100% means that all the caterpillars are killed whereas 0% means that none are killed.

The active compounds, their concentrations, the evaluation times and the results obtained can be seen from the following Table 1:

TABLE 1

| Active ingredient (constitution) | Concentration of active ingredient in percent | Degree of destruction in percent after 4 days |
|---|---|---|
| $(C_2H_5O)(C_2H_5)P(=S)-S-CH_2-CH_2-S-CH_2-N$ (3,4-dihydro-4-oxo-1,2,3-benzotriazin-3-yl) | 0.1 / 0.01 / 0.001 | 100 / 100 / 70 |
| $(C_2H_5O)(C_6H_5)P(=S)-S-CH_2-CH_2-S-CH_2-N$ (3,4-dihydro-4-oxo-1,2,3-benzotriazin-3-yl) | 0.1 / 0.01 | 100 / 100 |
| $(C_2H_5O)_2P(=S)-S-CH_2-CH_2-S-CH_2-N$ (3,4-dihydro-4-oxo-1,2,3-benzotriazin-3-yl) | 0.1 / 0.01 | 100 / 90 |
| $(C_2H_5O)_2P(=O)-S-CH_2-CH_2-S-CH_2-N$ (3,4-dihydro-4-oxo-1,2,3-benzotriazin-3-yl) | 0.1 / 0.01 | 100 / 50 |
| $(C_2H_5)(C_2H_5O)P(=S)-S-CH_2-CH_2-S-CH_2-N$ (3,4-dihydro-4-oxo-1,2,3-benzotriazin-3-yl) | 0.1 | 100 |

Example B
DROSOPHILA TEST

Solvent: 3 parts by weight of acetone
Emulsifier: 1 part by weight of alkylarylpolyglycolether To produce a suitable preparation of active compound, 1 part by weight of the active compound is mixed with the stated amount of solvent containing the stated amount of emulsifier and the concentrate is diluted with water to the desired concentration.

1 cc. of the preparation of the active compound is applied with a pipette to a filter paper disc of 7 cm. diameter. The wet disc is placed in a glass vessel containing 50 banada fruit flies (*Drosophila melanogaster*) and covered with a glass plate. After the specified periods of time, the destruction is determined as a percentage: 100% means that all the flies are killed whereas 0% means that none are killed.

The active compounds, their concentrations, the evaluation times and the degree of destruction can be seen from the following Table 2:

Example C
MYZUS TEST (CONTACT ACTION)

Solvent: 3 parts by weight of acetone
Emulsifier: 1 part by weight of alkylarylpolyglycolether To produce a suitable preparation of active compound, 1 part by weight of the active compound is mixed with the stated amount of solvent containing the stated amount of emulsifier and the concentrate is diluted with water to the desired concentration.

Cabbage plants (*Brassica oleracea*) which have been heavily infested with peach aphids (*Myzus persicae*) are sprayed with the preparation of the active compound until dripping wet.

After specified periods of time, the degree of destruction is determined as a percentage: 100% means that all the aphids are killed whereas 0% means that none are killed.

The active compounds, their concentrations, the evaluation times and the results obtained can be seen from the following Table 3:

TABLE 2

| Active ingredient (constitution) | Concentration of active ingredient in percent | Degree of destruction in percent after 24 hours |
|---|---|---|
| 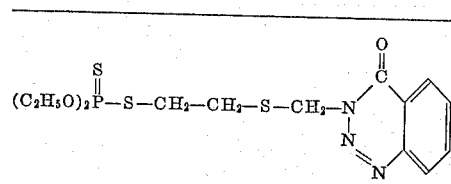 | 0.1<br>0.01 | 100<br>100 |
| 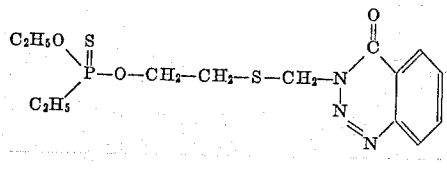 | 0.1<br>0.01 | 100<br>100 |
| 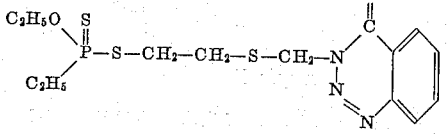 | 0.1 | 100 |

TABLE 3

| Active ingredient (constitution) | Concentration of active ingredient in percent | Degree of destruction in percent after 24 hours |
|---|---|---|
| 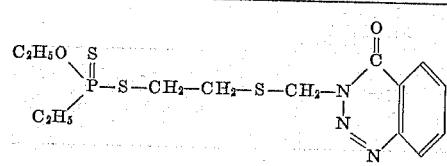 | 0.1<br>0.01<br>0.001 | 100<br>100<br>80 |
| 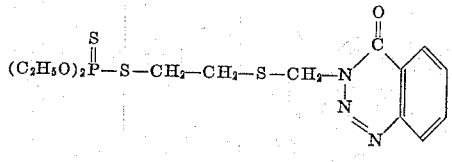 | 0.1<br>0.01 | 100<br>80 |
| 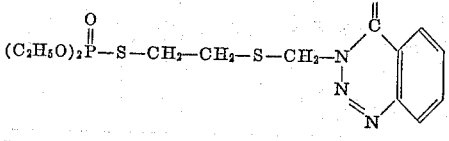 | 0.1 | 100 |

Example D
BOOPHILUS-TEST

Solvent: 3 parts by weight of acetone
Emulsifier: 1 part by weight of alkylarylpolyglycolether To produce a suitable preparation of active compound, 1 part by weight of the active compound is mixed with the stated amount of solvent containing the stated amount of emulsifier and the concentrate is diluted with water to the desired concentration.

10 female ticks of the type *Boophilus microplus* each are placed into mull bags which are brought into a solution prepared as described above while moving them continuously. After 1 minute the mull bags are taken off the active solutions and put into glass dishes in which filter paper is placed. The ticks are taken off the mull bags and placed upon dry filter paper. Evaluation occurred after 24 hours, 48, 72 and eventually 96 to 120 hours.

After specified periods of time, the degree of destruction is determined as a percentage: 100% means that all the ticks are killed whereas 0% means that none are killed.

The active compounds, their concentrations, the evaluation times and the results obtained can be seen from the folowing Table 4:

Example E
MUSCA DOMESTICA TEST

Solvent: 3 parts by weight of acetone
Emulsifier: 1 part by weight of alkylarylpolyglycolether To produce a suitable preparation of active compound, 1 part by weight of the active compound is mixed with the stated amount of solvent containing the stated amount of emulsifier and the concentrate is diluted with water to the desired concentration.

About 10 fly larvae are placed under covered petri dishes in which drip wet filter papers have been placed which were sprayed with an insecticidal solution of a concentration as shown below and prepared as indicated above. Evaluation occured after 10 days.

The active compounds, their concentrations and the results obtained can be seen from the following Table 5:

TABLE 5

| Active ingredient (constitution) | Concentration of active ingredient in percent | Degree of destruction in percent after 10 days |
|---|---|---|
| 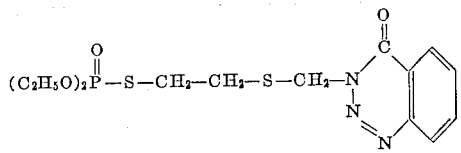 | 0.01<br>0.001 | 100<br>95 |
| 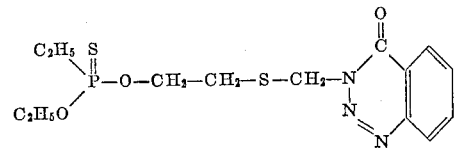 | 0.01<br>0.001 | 100<br>60 |

Example F

TEST WITH RATS REGARDING MAMMAL TOXICITY

Rats (5 each) were fed with baits containing the following inventive compounds in an amount of active ingredients as shown below.

The active compounds and the results obtained can be seen from Table 6.

TABLE 4

| Active ingredient (constitution) | Concentration of active ingredient in percent | Degree of destruction in percent after 4 days |
|---|---|---|
| 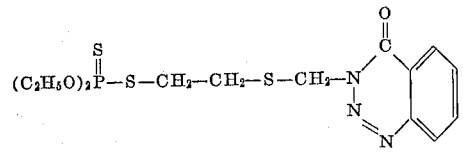 | 0.005 | 100 |
| 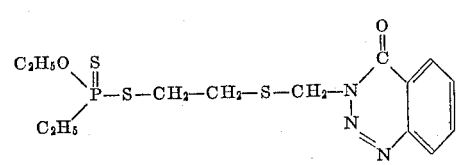 | 0.00025 | 100 |

TABLE 6

| Compound (constitution) | Mammal toxicity on rats per os ($LD_{50}$) in mg./kg. |
|---|---|
| $(C_2H_5O)_2\overset{\overset{S}{\|}}{P}-S-CH_2-CH_2-S-CH_2-N\begin{smallmatrix}\diagup C=O\\ \diagdown\end{smallmatrix}\bigg\langle\!\!\!\begin{smallmatrix}\\ \end{smallmatrix}$ (benzotriazinone) | 10 |
| $(C_2H_5O)_2\overset{\overset{O}{\|}}{P}-S-CH_2-CH_2-S-CH_2-N\begin{smallmatrix}\diagup C=O\\ \diagdown\end{smallmatrix}\bigg\langle\!\!\!\begin{smallmatrix}\\ \end{smallmatrix}$ | 5 |
| $\begin{smallmatrix}C_2H_5O\\C_2H_5\end{smallmatrix}\overset{\overset{S}{\|}}{P}-S-CH_2-CH_2-S-CH_2-N\begin{smallmatrix}\diagup C=O\\ \diagdown\end{smallmatrix}\bigg\langle\!\!\!\begin{smallmatrix}\\ \end{smallmatrix}$ | 5 |
| $\begin{smallmatrix}C_6H_5\\C_2H_5O\end{smallmatrix}\overset{\overset{S}{\|}}{P}-S-CH_2-CH_2-S-CH_2-N\begin{smallmatrix}\diagup C=O\\ \diagdown\end{smallmatrix}\bigg\langle\!\!\!\begin{smallmatrix}\\ \end{smallmatrix}$ | 10 |
| $\begin{smallmatrix}C_2H_5\\C_2H_5O\end{smallmatrix}\overset{\overset{S}{\|}}{P}-O-CH_2-CH_2-S-CH_2-N\begin{smallmatrix}\diagup C=O\\ \diagdown\end{smallmatrix}\bigg\langle\!\!\!\begin{smallmatrix}\\ \end{smallmatrix}$ | 500 |

Example G
PSOROPTES CUNICULI TEST

Solvent: Xylene
Liquid paraffin

To produce a suitable preparation of active compound, 1 part by weight of the active compound is dissolved in xylene. This preparation is diluted with liquid paraffin (1:10).

In the preparation of active compound prepared as shown above, mites of the species *Psoroptes cuniculi* of all states of developoment are brought.

After specified periods of time the effectiveness of the preparation of active ingredient is determined by counting the heavily damaged and the killed mites. The effectiveness is given in percent. It means:

100% = all mites heavily damaged-killed
>50% = more than 50% of mites heavily damaged-killed
<50% = less than 50% of mites heavily damaged-killed
0% = no mites heavily damaged or killed.

The active compounds, their concentrations, the evaluation times and the results obtained can be seen from the following Table 7:

TABLE 7

| Active ingredient | Concentration of active ingredient in percent | Destruction of pests in percent after 24 hours |
|---|---|---|
| $(C_2H_5O)_2\overset{\overset{O}{\|}}{P}-S-CH_2-CH_2-S-CH_2-N\begin{smallmatrix}\diagup C=O\\ \diagdown\end{smallmatrix}\bigg\langle\!\!\!\begin{smallmatrix}\\ \end{smallmatrix}$ | 0.01<br>0.001 | 100<br>>50 |

It will be appreciated that the instant specification and examples are set forth by way of illustration, and not limitation, and that various modifications and changes may be made without departing from the spirit and scope of the present invention which is to be limited only by the scope of the appended claims.

What is claimed is:

1. Thio-phosphorus acid ester of the formula

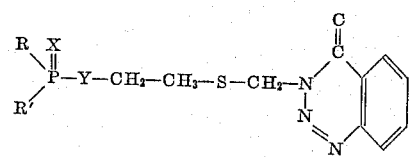

in which R and R' each respectively represents a member selected from the group consisting of lower alkyl, lower alkoxy, and phenyl, and X and Y each respectively represents a member selected from the group consisting of oxygen and sulfur, at least one of X and Y being sulfur.

2. O,O-dialkyl-S-(3,4-dihydro-4-oxo-1,2,3-benzotriazin-3-yl-methylmercapto-ethyl) - thionothiol-phosphoric acid ester of the formula

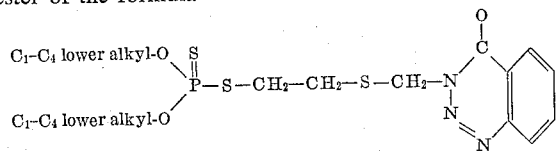

3. O,O-dialkyl-S-(3,4-dihydro-4-oxo-1,2,3-benzotriazin-3-yl-methylmercapto-ethyl)-thiol-phosphoric acid ester of the formula

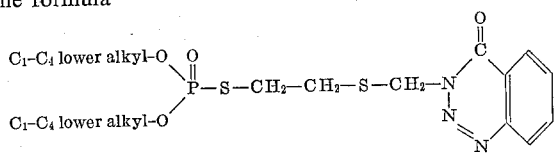

4. Alkyl-O-alkyl-S-(3,4-dihydro - 4-oxo-1,2,3-benzotriazin-3-yl-methylmercapto-ethyl) - thionothiol-phosphonic acid ester of the formula

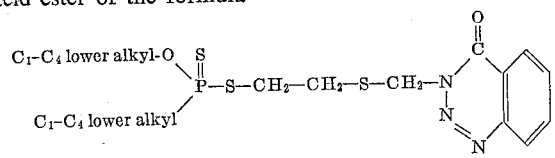

5. Phenyl-O-alkyl-S-(3,4-dihydro - 4-oxo - 1,2,3-benzotriazin-3-yl-methylmercapto-ethyl) - thionothiol-phosphonic acid ester of the formula

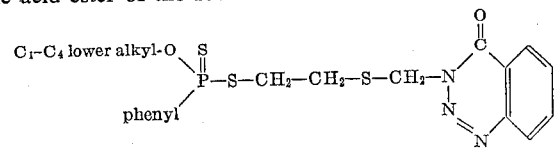

6. Alkyl-O-alkyl-O-(3,4-dihydro - 4-oxo - 1,2,3-benzotriazin - 3-yl-methylmercapto-ethyl) - thiono-phosphonic acid ester of the formula

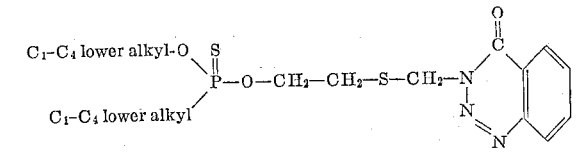

7. O,O-diethyl-S-(3,4-dihydro - 4-oxo - 1,2,3-benzotriazin - 3-yl-methylmercapto-ethyl) - thionothiol-phosphoric acid ester.

8. O,O-diethyl-S-(3,4-dihydro - 4-oxo - 1,2,3-benzotriazin - 3-yl-methylmercapto-ethyl) - thiol-phosphoric acid ester.

9. Ethyl-O-ethyl-S-(3,4-dihydro - 4-oxo - 1,2,3-benzotriazin - 3-yl-methylmercapto-ethyl) - thionothiol-phosphonic acid ester.

10. Phenyl-O-ethyl-S-(3,4-dihydro - 4-oxo-1,2,3-benzotriazin - 3-yl-methylmercapto-ethyl) - thionothiol-phosphonic acid ester.

11. Ethyl-O-ethyl-O-(3,4-dihydro - 4-oxo - 1,2,3-benzotriazin - 3-yl-methylmercapto-ethyl) - thiono-phosphonic acid ester.

References Cited

UNITED STATES PATENTS

| | | | |
|---|---|---|---|
| 2,843,588 | 7/1958 | Lorenz | 260—248 |
| 2,914,530 | 11/1959 | Schrader et al. | 260—248 |
| 3,202,658 | 8/1965 | Lorenz et al. | 260—248 |
| 3,216,894 | 11/1965 | Lorenz et al. | 260—248 |
| 3,232,830 | 1/1966 | Schrader et al. | 260—248 |

WALTER A. MODANCE, *Primary Examiner.*

JOHN M. FORD, *Assistant Examiner.*